(No Model.)
A. SCHNEIDER.
DETACHABLE DOG LINE.
No. 431,402. Patented July 1, 1890.
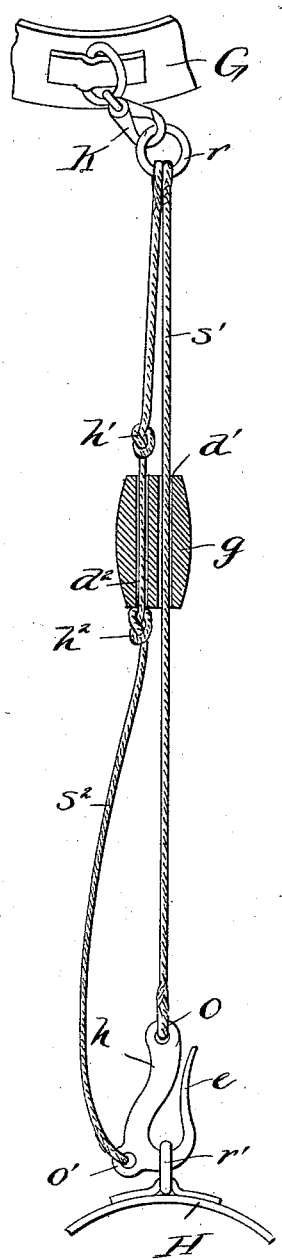
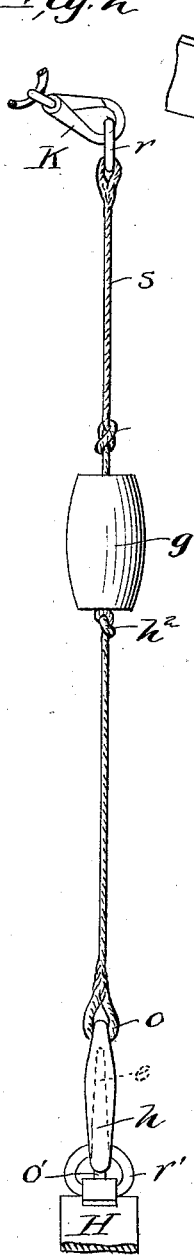
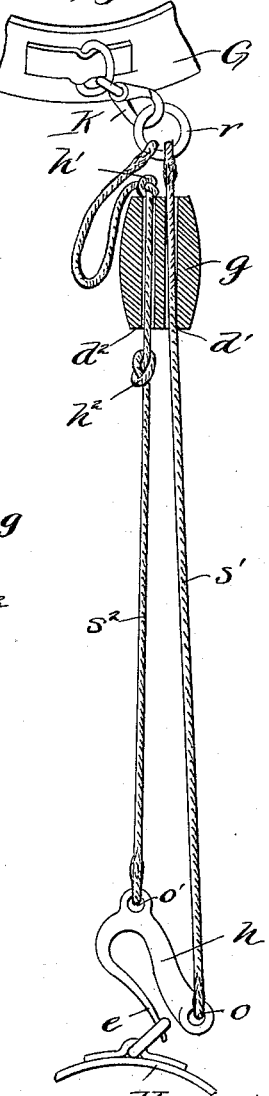
Witnesses —
W. F. Keene.
James M. Spear
Inventor
August Schneider
By Ellis Spear
Atty.

UNITED STATES PATENT OFFICE.

AUGUST SCHNEIDER, OF DRESDEN-NEUSTADT, SAXONY, GERMANY.

DETACHABLE DOG-LINE.

SPECIFICATION forming part of Letters Patent No. 431,402, dated July 1, 1890.

Application filed January 8, 1890. Serial No. 336,321. (No model.)

*To all whom it may concern:*

Be it known that I, AUGUST SCHNEIDER, of Dresden-Neustadt, in the Kingdom of Saxony and German Empire, have invented a new and useful Easy-Disengaging Dog-Line, of which the following is a specification, reference being had therein to the accompanying drawings.

This invention relates to producing a dog-slip which can be more easily loosened and refastened than those hitherto in use, particularly when the hands are stiff with cold.

In the drawings hereto annexed, Figure 1 is a side view of the slip; Fig. 2 is a front view of same, and Fig. 3 illustrates the mode of slipping or loosening the dog.

This slip consists of a wooden sliding block $g$, pierced lengthwise with two perforations $d'$ $d^2$, a hook $h$ with two eyes $o$ and $o'$, a ring $r$, and two lines $s'$ and $s^2$. The line $s'$ is fastened to the ring $r$ and passes through the perforation $d'$ of the block $g$ to the eye $o$ of the hook $h$. The line $s^2$ leads from the ring $r$, through the perforation $d^2$ of the block $g$, to the eye $o'$, provided on the bend of the hook, and is provided over and under the block $g$ with knots $h'$ and $h^2$, so that the block is held between the knots $h'$ and $h^2$. The line itself is either fastened to the sportsman's belt G by the clasp K or to his game-bag, as convenient, and the hook $h$ is hooked to the ring $r'$, attached to the dog's collar H. The end of the hook $h$ is made pliable, like a spring, and the ring $r'$ can only come out when the end $e$ is pressed away from the body of the hook $h$.

When it is required, by means of this contrivance, to loosen a dog held by a sportsman, the block $g$ has only to be taken hold of with the hand and to be drawn up the line $s'$, as shown in Fig. 3. In this manner the opening of the hook $h$ is turned downward, so that the ring $r'$ is drawn out of the hook $h$ in consequence of the tugging of the dog. When the dog returns, it is only necessary to enter the hook $h$ into the ring $r'$ at the end $e$, so that the dog, by tugging, again pulls the ring $r'$ back into the hook, in the manner described, and shown in the drawings.

What I claim, and desire to secure by Letters Patent of the United States, is—

A dog-slip comprising the lines $s'$ $s^2$, a hook $h$ with eyes $o$ $o'$, and a block $g$, substantially as described.

In witness whereof I have hereunto set my hand in presence of two witnesses.

AUGUST SCHNEIDER.

Witnesses:
 ERNST MARCUS,
 AUGUST RASCH.